(12) United States Patent
Xue et al.

(10) Patent No.: US 11,260,372 B2
(45) Date of Patent: Mar. 1, 2022

(54) CATALYST SYSTEM FOR LEAN GASOLINE DIRECT INJECTION ENGINES

(71) Applicant: BASF Corporation, Florham Park, NJ (US)

(72) Inventors: Wen-mei Xue, Dayton, NJ (US); Attilio Siani, Hannover (DE); John K. Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 167 days.

(21) Appl. No.: 16/062,256

(22) PCT Filed: Dec. 15, 2016

(86) PCT No.: PCT/IB2016/057684
§ 371 (c)(1),
(2) Date: Jun. 14, 2018

(87) PCT Pub. No.: WO2017/103855
PCT Pub. Date: Jun. 22, 2017

(65) Prior Publication Data
US 2018/0361360 A1 Dec. 20, 2018

Related U.S. Application Data

(60) Provisional application No. 62/268,019, filed on Dec. 16, 2015.

(51) Int. Cl.
*B01J 21/04* (2006.01)
*B01J 23/10* (2006.01)
(Continued)

(52) U.S. Cl.
CPC .......... *B01J 23/462* (2013.01); *B01D 53/945* (2013.01); *B01D 53/9418* (2013.01);
(Continued)

(58) Field of Classification Search
CPC ... B01J 21/04; B01J 23/10; B01J 23/40; B01J 23/42; B01J 23/44; B01J 23/462;
(Continued)

(56) References Cited

U.S. PATENT DOCUMENTS 6,087,298 A * 7/2000 Sung .................. B01D 53/9472
502/333
6,497,851 B1 * 12/2002 Hu ....................... B01D 53/944
423/213.5
(Continued)

FOREIGN PATENT DOCUMENTS

EP 1265691 A1 12/2002
JP 2002-540916 A 12/2002

OTHER PUBLICATIONS

European Search Report for EP Patent Application No. 16875028.9, dated Jul. 12, 2019, 3 pages.
(Continued)

*Primary Examiner* — Cam N. Nguyen
(74) *Attorney, Agent, or Firm* — Baltazar Gomez

(57) ABSTRACT

A lean gasoline exhaust treatment catalyst article is provided, the article comprising a catalytic material applied on a substrate, wherein the catalytic material comprises a first composition and a second composition, wherein the first and second compositions are present in a layered or zoned configuration, the first composition comprising palladium impregnated onto a porous refractory metal oxide material and rhodium impregnated onto a porous refractory metal oxide material; and the second composition comprising platinum impregnated onto a porous refractory metal oxide material. Methods of making and using such catalyst articles and the associated compositions and systems employing such catalyst articles are also described.

24 Claims, 4 Drawing Sheets

(51) Int. Cl.
| | |
|---|---|
| *B01J 23/40* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 35/00* | (2006.01) |
| *B01J 35/04* | (2006.01) |
| *B01J 37/02* | (2006.01) |
| *F01N 3/10* | (2006.01) |
| *F01N 3/28* | (2006.01) |
| *B01D 53/94* | (2006.01) |
| *F01N 3/035* | (2006.01) |
| *F01N 3/08* | (2006.01) |

(52) U.S. Cl.
CPC ..... *B01D 53/9422* (2013.01); *B01D 53/9468* (2013.01); *B01D 53/9472* (2013.01); *B01D 53/9477* (2013.01); *B01J 21/04* (2013.01); *B01J 23/10* (2013.01); *B01J 23/42* (2013.01); *B01J 23/44* (2013.01); *B01J 23/464* (2013.01); *B01J 23/58* (2013.01); *B01J 35/0006* (2013.01); *B01J 35/04* (2013.01); *B01J 37/0201* (2013.01); *B01J 37/0228* (2013.01); *B01J 37/0242* (2013.01); *B01J 37/0244* (2013.01); *B01J 37/0248* (2013.01); *F01N 3/101* (2013.01); *F01N 3/2807* (2013.01); *F01N 3/2828* (2013.01); *B01D 53/9431* (2013.01); *B01D 2255/1021* (2013.01); *B01D 2255/1023* (2013.01); *B01D 2255/1025* (2013.01); *B01D 2255/206* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/20715* (2013.01); *B01D 2255/407* (2013.01); *B01D 2255/908* (2013.01); *B01D 2255/9022* (2013.01); *B01D 2255/9032* (2013.01); *F01N 3/035* (2013.01); *F01N 3/0814* (2013.01); *F01N 2250/02* (2013.01); *F01N 2330/02* (2013.01); *F01N 2330/06* (2013.01); *F01N 2370/02* (2013.01); *F01N 2510/0682* (2013.01); *F01N 2510/0684* (2013.01); *Y02T 10/12* (2013.01)

(58) Field of Classification Search
CPC ...... B01J 23/464; B01J 23/58; B01J 35/0006; B01J 35/04; B01J 37/0201; B01J 37/0228; B01J 37/0242; B01J 37/0244; B01J 37/0248; F01N 3/101; F01N 3/2807; F01N 3/2828; B01D 53/9418; B01D 53/9422; B01D 53/945; B01D 53/9468; B01D 53/9472; B01D 53/9477
See application file for complete search history.

(56) References Cited

U.S. PATENT DOCUMENTS

| | | | | |
|---|---|---|---|---|
| 7,374,729 | B2* | 5/2008 | Chen | B01D 53/945 422/177 |
| 7,501,098 | B2* | 3/2009 | Chen | B01D 53/945 422/177 |
| 7,524,465 | B2* | 4/2009 | Kumar | B01J 23/44 422/180 |
| 7,749,472 | B2* | 7/2010 | Chen | B01D 53/945 423/213.2 |
| 7,947,238 | B2* | 5/2011 | Deeba | B01D 53/944 423/213.2 |
| 8,246,923 | B2* | 8/2012 | Southward | B01J 37/0242 423/213.5 |
| 8,568,675 | B2* | 10/2013 | Deeba | B01D 53/945 423/213.5 |
| 8,637,426 | B2* | 1/2014 | Hoke | B01D 53/945 502/339 |
| 8,828,343 | B2* | 9/2014 | Liu | B01D 53/945 423/213.5 |
| 8,950,174 | B2 | 2/2015 | Hilgendorff | |
| 9,034,286 | B2* | 5/2015 | Bergeal | B01J 23/005 423/213.5 |
| 9,044,734 | B2* | 6/2015 | Grubert | B01J 37/0244 |
| 9,057,310 | B2* | 6/2015 | Bergeal | B01J 21/12 |
| 9,242,242 | B2* | 1/2016 | Hilgendorff | B01D 53/9477 |
| 9,440,192 | B2* | 9/2016 | Hoke | B01D 53/9477 |
| 9,517,448 | B2* | 12/2016 | Kearl | B01J 35/0006 |
| 9,527,034 | B2* | 12/2016 | Bergeal | B01D 53/945 |
| 9,527,035 | B2* | 12/2016 | Bergeal | B01J 35/04 |
| 9,643,161 | B2* | 5/2017 | Chiffey | B01J 37/0246 |
| 9,744,529 | B2* | 8/2017 | Xue | B01J 35/04 |
| 9,981,258 | B2* | 5/2018 | Xue | B01J 35/04 |
| 9,987,618 | B2* | 6/2018 | Chiffey | B01J 37/0244 |
| 10,137,414 | B2* | 11/2018 | Hoke | B01J 37/0244 |
| 10,188,987 | B2* | 1/2019 | Li | F01N 3/2066 |
| 10,252,217 | B2* | 4/2019 | Zhang | B01J 23/464 |
| 10,279,314 | B2* | 5/2019 | Bergeal | B01J 35/0006 |
| 10,512,898 | B2* | 12/2019 | Deeba | B01D 53/945 |
| 10,569,257 | B2* | 2/2020 | Chiffey | B01D 53/9472 |
| 10,625,208 | B2* | 4/2020 | Bergeal | B01D 53/9468 |
| 10,773,209 | B2* | 9/2020 | Liu | B01D 53/945 |
| 2002/0048542 | A1 | 4/2002 | Deeba et al. | |
| 2004/0001781 | A1* | 1/2004 | Kumar | F01N 3/0814 422/180 |
| 2008/0226514 | A1* | 9/2008 | Chen | B01J 35/04 422/168 |
| 2010/0150792 | A1 | 6/2010 | Kitamura et al. | |
| 2011/0287928 | A1 | 11/2011 | Nakatsuji et al. | |
| 2014/0205523 | A1 | 7/2014 | Arnold et al. | |
| 2015/0266014 | A1 | 9/2015 | Xue et al. | |
| 2015/0336085 | A1 | 11/2015 | Hoyer et al. | |
| 2017/0043322 | A1* | 2/2017 | Chandler | B01J 37/0244 |
| 2019/0060833 | A1* | 2/2019 | Hoke | B01J 35/04 |
| 2019/0105636 | A1* | 4/2019 | Wang | B01D 53/945 |
| 2019/0240643 | A1* | 8/2019 | Karpov | B01J 37/0244 |
| 2019/0331013 | A1* | 10/2019 | Sung | B01D 53/945 |
| 2020/0206721 | A1* | 7/2020 | Chiffey | B01D 53/944 |

OTHER PUBLICATIONS

International Search Report for PCT Application No. PCT/IB2016/057684, dated Mar. 16, 2017, 3 pages.

Park et al., Emission Reduction Characteristics of Three-Way Catalyst with Engine Operating Condition Change in an Ultra-Lean Gasoline Direct Injection Engine, *Trans. Korean Soc. Mech. Eng. B*, 2015, vol. 39, No. 9, pp. 727-734.

Pihl et al., "Lean NOx Trap Chemistry Under Lean-Gasoline Exhaust Conditions: Impact of High NOx Concentrations and High Temperature," 2013, *Top Catal.*, vol. 56, pp. 89-93.

Theis et al., "The Effects of High Temperature Lean Exposure on the Subsequent HC Conversion of Automotive Catalysts," 2012, *Catalysis Today*, vol. 184, pp. 262-270.

\* cited by examiner

CATALYST SYSTEM FOR LEAN GASOLINE DIRECT INJECTION ENGINES

CROSS-REFERENCE TO RELATED APPLICATIONS

The present application is a U.S. National Stage of International Patent Application PCT/IB2016/057684, filed Dec. 15, 2016 and claims priority to U.S. Provisional Patent Application No. 62/268,019, filed Dec. 16, 2015. The disclosures of each of the applications noted above are incorporated herein by reference in their entirety.

FIELD OF THE INVENTION

The present invention relates to a gasoline exhaust purifying catalyst composition, catalyst articles coated with such a composition, emission treatment systems comprising such a catalyst article, and methods of use thereof.

BACKGROUND OF THE INVENTION

Stringent emission regulations on light-duty gasoline vehicles such as US LEV III and EURO 7 demand advanced three-way conversion (TWC) catalyst systems. By 2025, for instance, super ultra-low emission vehicles (SULEV) are projected to have a substantial market share in North America, requiring combined non-methane hydrocarbon (NMHC) and $NO_x$ emissions of less than 30 mg/mile under warranty of 15 years and 150 K miles on a fleet average. $NO_x$ is a term used to describe various chemical species of nitrogen oxides, including nitrogen monoxide (NO) and nitrogen dioxide ($NO_2$), among others. Carbon dioxide ($CO_2$) reduction is of considerable concern as well. By 2025, the targeted maximum for fleet $CO_2$ emissions is reduced by more than 50% as compared with the targeted maximum in 2006 (from 249 g/km to 107 g/km in North America).

Lean burn gasoline engines are desirable in this regard, as they can exhibit improved fuel economy and reduced $CO_2$ emissions. Lean burn gasoline engines operate outside the range of stoichiometric conditions. The precise proportion of air to fuel which results in stoichiometric conditions varies with the relative proportions of carbon and hydrogen in the fuel. An air-to-fuel (A/F) ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

In a lean burn engine, the ratio of air to fuel in the combustion mixture supplied to the engine is maintained considerably above the stoichiometric ratio. As such, the air/fuel ratio of lean systems is unbalanced (i.e., non-stoichiometric), with an exemplary air-to-fuel weight ratio of about 30:1, or even significantly higher (e.g., 40:1). The resulting exhaust gases are "lean," i.e., are relatively high in oxygen content. However, oxygen-rich exhaust makes $NO_x$ reduction a challenge, as traditional TWC catalysts are not effective for reducing the $NO_x$ emissions from such engines due to the excessive oxygen. Attempts to overcome this problem have included the use of a lean $NO_x$ trap (LNT) in conjunction with a TWC catalyst. In such systems, the TWC catalyst can convert hydrocarbons (HC), carbon monoxide (CO), and $NO_x$ to $CO_2$, water ($H_2O$) and nitrogen ($N_2$) during stoichiometric operations and an LNT stores $NO_x$ during lean conditions and converts the stored $NO_x$ to $N_2$ during rich operations. Typically, an SCR is also employed, to convert $NO_x$ slipped from the LNT.

Due to space limitations, however, using a separate TWC together with a separate LNT is not ideal. Thus, there is a need for a technology that balances standard TWC activity with LNT functionality, while alleviating the space concerns that occur when a separate TWC catalyst is used together with a separate LNT. Further, although TWC catalysts operating under lean conditions can generally perform HC oxidation, the lightoff temperature is generally above 300° C. The engine-out temperature during lean excursion can be much lower than that during stoichiometric operation, which poses a challenge in hydrocarbon (HC) conversion. TWC catalysts do not efficiently convert hydrocarbons at low temperatures (e.g. below 250° C.). To meet current governmental emissions regulations, there is a need for a technology that addresses both hydrocarbon (HC) conversion under lean conditions at low temperature and hydrocarbon, and CO and NOx conversions under stoichiometric condition.

SUMMARY OF THE INVENTION

The present disclosure provides three way conversion (TWC) catalyst compositions, wherein the compositions comprise one or more platinum group metals (PGMs). The catalyst compositions can be provided in the form of a catalyst article comprising, e.g., two or more compositions such that the catalyst article comprises at least one washcoat layer thereon, the washcoat layer comprising the one or more PGMs.

In one aspect of the invention, a catalyst article for treating an exhaust stream of an internal combustion engine is provided, the article comprising a catalytic material applied on a substrate, wherein the catalytic material comprises a first composition and a second composition, wherein the first and second compositions are present in a layered or zoned configuration, the first composition comprising palladium impregnated onto a porous refractory metal oxide material and rhodium impregnated onto a porous refractory metal oxide material; and the second composition comprising platinum impregnated onto a porous refractory metal oxide material.

The relationship of the first and second compositions with respect to one another can vary. The compositions can, in some embodiments, be in layered form. For example, in some embodiments, the catalytic material is in layered form, such that the first composition is disposed on the substrate as a first layer and the second composition is overlying at least a portion of the first composition as a second layer. In other embodiments, the catalytic material is in layered form, such that the second composition is disposed on the substrate as a first layer and the first composition is overlying at least a portion of the second composition as a second layer. The catalytic materials may be in zoned form. For example, in certain embodiments, both the first and second compositions are disposed on the substrate, wherein the first composition is disposed on a region of the substrate upstream of the region on which the second composition is disposed. In other embodiments, both the first and second compositions are disposed on the substrate, and wherein the second composition is disposed on a region of the substrate upstream of the region on which the first composition is disposed.

In the first composition, the palladium-impregnated metal oxide material and the rhodium-impregnated metal oxide material may, in some embodiments, be intimately mixed.

The palladium-impregnated metal oxide material and the rhodium-impregnated metal oxide material in the first composition can be mixed in varying weight ratios and, in some embodiments, are present in a weight ratio of about 1:5 to about 5:1. In certain embodiments, at least a portion of the porous refractory metal oxide onto which the palladium is impregnated in the first composition is selected from the group consisting of alumina, alumina-zirconia, alumina-ceria-zirconia, lanthana-alumina, lanthana-zirconia-alumina, baria-alumina, baria-lanthana-alumina, baria-lanthana-neodymia-alumina, and alumina-ceria. For example, in some particular embodiments, at least a portion of the porous refractory metal oxide onto which the palladium is impregnated in the first composition is alumina.

In some embodiments, at least a portion of the porous refractory metal oxide onto which the palladium is impregnated in the first composition is an oxygen storage component. Exemplary oxygen storage components suitable for such purposes include, but are not limited to, oxygen storage component is selected from the group consisting of ceria, lanthana, praseodymia, neodymia, niobia, europia, samaria, ytterbia, yttria, zirconia, and combinations and composites thereof. In one embodiment, the oxygen storage component is a ceria-zirconia composite, such as a composite selected from the group consisting of ceria-zirconia, ceria-zirconia-lanthana, and combinations thereof.

In a particular embodiment, the porous refractory metal oxide onto which the palladium is impregnated in the first composition comprises alumina and an oxygen storage component. In some embodiments, a portion of the palladium in the first composition is impregnated onto alumina and a portion of the palladium in the first composition is impregnated onto an oxygen storage component, and the rhodium in the first composition is impregnated onto alumina. Where the palladium in the first composition is impregnated onto two or more types of porous refractory metal oxides, the ratio of palladium on the two or more types of porous refractory metal oxides can vary. For example, in one embodiment, the about 25% to about 75% of the total weight of palladium in the first composition is impregnated onto an oxygen storage component.

With regard to the second composition, the second composition can, in certain embodiments, further comprise palladium impregnated onto the porous refractory metal oxide material therein. The weight ratio of platinum to palladium in the second composition can vary, for example, in various embodiments, the weight ratio of platinum to palladium in the second composition may be, e.g., about 2:1 to about 100:1 or about 8:1 to about 12:1. In various embodiments, the second composition can be substantially free of ceria.

The compositions generally disclosed herein can be applied on various types of substrates. In some embodiments, the substrate can be a monolithic substrate. The disclosed catalyst article may, in some embodiments, comprise catalytic material effective to convert carbon monoxide, nitrogen oxides, and hydrocarbons simultaneously. In some embodiments, under lean engine conditions, the catalytic material is effective to oxidize hydrocarbons at temperatures of about 200° C. to about 250° C.

In another aspect, the present disclosure provides an exhaust gas treatment system comprising the catalyst articles described herein, located downstream of an engine producing an exhaust stream. In some embodiments, such an exhaust gas treatment system further comprises one or more additional components, including but not limited to, components selected from the group consisting of three-way conversion catalyst (TWC), an integrated lean $NO_x$ trap-three way conversion catalyst (LNT-TWC), a selective catalytic reduction (SCR) catalyst, a lean NOx trap (LNT), an ammonia oxidation (AMOx) catalyst, and a SCR catalyst on a filter (SCRoF). In some embodiments, the exhaust gas treatment system comprises an SCR catalyst downstream of the catalyst article and in some embodiments, the exhaust gas treatment system comprises a LNT downstream of the catalyst article. In certain embodiments, the exhaust gas treatment system can comprise an AMOx downstream of the catalyst article.

In a further aspect, the disclosure provides a method for treating an exhaust gas stream comprising hydrocarbons, carbon monoxide, and nitrogen oxides, comprising contacting the exhaust gas stream with a catalyst article as described herein, wherein, under lean engine conditions, the catalytic material is effective to oxidize hydrocarbons at temperatures of about 200° C. to about 250° C.; and wherein, under stoichiometric engine conditions, the catalytic material is effective to convert carbon monoxide, nitrogen oxides, and hydrocarbons simultaneously.

In a still further aspect, the disclosure provides a method for making a tri-metal catalyst article, comprising: impregnating palladium onto a first porous refractory metal oxide material; impregnating rhodium onto a second porous refractory metal oxide material; combining the first and second impregnated porous refractory oxide materials to give a first composition; impregnating platinum onto a third porous refractory metal oxide material to give a second composition; applying the first and second compositions onto a substrate such that the first and second compositions are present in a layered or zoned configuration. In some such embodiments, the first, second, and third refractory metal oxide materials comprise alumina.

In some such embodiments, the impregnating palladium step comprises impregnating at least a portion of the palladium onto alumina and impregnating at least a portion of the palladium onto an oxygen storage component. In some embodiment, the method further comprises further comprises impregnating palladium onto the third porous refractory material. This third porous refractory material in certain embodiments, is substantially free of ceria.

The invention includes, without limitation, the following embodiments.

Embodiment 1 a catalyst article for treating an exhaust stream of an internal combustion engine, the article comprising a catalytic material applied on a substrate, wherein the catalytic material comprises a first composition and a second composition, wherein the first and second compositions are present in a layered or zoned configuration, the first composition comprising palladium impregnated onto a porous refractory metal oxide material and rhodium impregnated onto a porous refractory metal oxide material; and the second composition comprising platinum impregnated onto a porous refractory metal oxide material.

Embodiment 2

The catalyst article of any preceding or subsequent embodiment, wherein the catalytic material is in layered form, such that the first composition is disposed on the substrate as a first layer and the second composition is overlying at least a portion of the first composition as a second layer.

Embodiment 3

The catalyst article of any preceding or subsequent embodiment, wherein the catalytic material is in layered form, such that the second composition is disposed on the substrate as a first layer and the first composition is overlying at least a portion of the second composition as a second layer.

Embodiment 4

The catalyst article of any preceding or subsequent embodiment, wherein the catalytic material is in zoned form, such that both the first and second compositions are disposed on the substrate, and wherein the first composition is disposed on a region of the substrate upstream of the region on which the second composition is disposed.

Embodiment 5

The catalyst article of any preceding or subsequent embodiment, wherein the catalytic material is in zoned form, such that both the first and second compositions are disposed on the substrate, and wherein the second composition is disposed on a region of the substrate upstream of the region on which the first composition is disposed.

Embodiment 6

The catalyst article of any preceding or subsequent embodiment, wherein the palladium-impregnated metal oxide material and the rhodium-impregnated metal oxide material in the first composition are intimately mixed.

Embodiment 7

The catalyst article of any preceding or subsequent embodiment, wherein the palladium-impregnated metal oxide material and the rhodium-impregnated metal oxide material in the first composition are present in a weight ratio of about 1:5 to about 5:1.

Embodiment 8

The catalyst article of any preceding or subsequent embodiment, wherein at least a portion of the porous refractory metal oxide onto which the palladium is impregnated in the first composition is selected from the group consisting of alumina, alumina-zirconia, alumina-ceria-zirconia, lanthana-alumina, lanthana-zirconia-alumina, baria-alumina, baria-lanthana-alumina, baria-lanthana-neodymia-alumina, and alumina-ceria.

Embodiment 9

The catalyst article of any preceding or subsequent embodiment, wherein at least a portion of the porous refractory metal oxide onto which the palladium is impregnated in the first composition is alumina.

Embodiment 10

The catalyst article of any preceding or subsequent embodiment, wherein at least a portion of the porous refractory metal oxide onto which the palladium is impregnated in the first composition is an oxygen storage component.

Embodiment 11

The catalyst article of any preceding or subsequent embodiment, wherein the oxygen storage component is selected from the group consisting of ceria, lanthana, praseodymia, neodymia, niobia, europia, samaria, ytterbia, yttria, zirconia, and combinations and composites thereof.

Embodiment 12

The catalyst article of any preceding or subsequent embodiment, wherein the oxygen storage component is a ceria-zirconia composite.

Embodiment 13

The catalyst article of any preceding or subsequent embodiment, wherein the ceria zirconia composite is selected from the group consisting of ceria-zirconia, ceria-zirconia-lanthana, and combinations thereof.

Embodiment 14

The catalyst article of any preceding or subsequent embodiment, wherein the porous refractory metal oxide onto which the palladium is impregnated in the first composition comprises alumina and an oxygen storage component.

Embodiment 15

The catalyst article of any preceding or subsequent embodiment, wherein a portion of the palladium in the first composition is impregnated onto alumina and a portion of the palladium in the first composition is impregnated onto an oxygen storage component, and wherein the rhodium in the first composition is impregnated onto alumina.

Embodiment 16

The catalyst article of any preceding or subsequent embodiment, wherein about 25% to about 75% of the total weight of palladium in the first composition is impregnated onto an oxygen storage component.

Embodiment 17

The catalyst article of any preceding or subsequent embodiment, wherein the second composition further comprises palladium impregnated onto the porous refractory metal oxide material therein.

Embodiment 18

The catalyst article of any preceding or subsequent embodiment, wherein the weight ratio of platinum to palladium in the second composition is about 2:1 to about 100.1.

Embodiment 19

The catalyst article of any preceding or subsequent embodiment, wherein the weight ratio of platinum to palladium in the second composition is about 8:1 to about 12:1.

Embodiment 20

The catalyst article of any preceding or subsequent embodiment, wherein the second composition is substantially free of ceria.

Embodiment 21

The catalyst article of any preceding or subsequent embodiment, wherein the substrate is a monolithic substrate.

Embodiment 22

The catalyst article of any preceding or subsequent embodiment, wherein, under stoichiometric engine conditions, the catalytic material is effective to convert carbon monoxide, nitrogen oxides, and hydrocarbons simultaneously.

Embodiment 23

The catalyst article of any preceding or subsequent embodiment, wherein, under lean engine conditions, the catalytic material is effective to oxidize hydrocarbons at temperatures of about 200° C. to about 250° C.

Embodiment 24

An exhaust gas treatment system comprising the catalyst article of any preceding or subsequent embodiment, located downstream of an internal combustion engine producing an exhaust stream.

Embodiment 25

The exhaust gas treatment system of any preceding or subsequent embodiment, wherein the engine comprises a lean burn engine.

Embodiment 26

The exhaust gas treatment system of any preceding or subsequent embodiment, further comprising one or more components selected from the group consisting of an integrated lean $NO_x$ trap-three way conversion catalyst (LNT-TWC), a selective catalytic reduction (SCR) catalyst, a lean $NO_x$ trap (LNT), an ammonium oxidation (AMOx) catalyst, an ammonia-generating catalyst, and a selective catalytic reduction catalyst on a filter (SCRoF).

Embodiment 27

The exhaust gas treatment system of any preceding or subsequent embodiment, further comprising a SCR catalyst downstream of the catalyst article.

Embodiment 28

The exhaust gas treatment system of any preceding or subsequent embodiment, further comprising a LNT downstream of the catalyst article.

Embodiment 29

The exhaust gas treatment system of any preceding or subsequent embodiment, further comprising an AMOx downstream of the catalyst article.

Embodiment 30

A method for treating an exhaust gas stream comprising hydrocarbons, carbon monoxide, and nitrogen oxides, comprising: contacting the exhaust gas stream with the catalyst article of any preceding or subsequent embodiment, wherein, under lean engine conditions, the catalytic material is effective to oxidize hydrocarbons at temperatures of about 250° C. and below; and wherein, under stoichiometric engine conditions, the catalytic material is effective to convert carbon monoxide, nitrogen oxides, and hydrocarbons simultaneously.

Embodiment 31

A method for making a tri-metal catalyst article, comprising: impregnating palladium onto a first porous refractory metal oxide material; impregnating rhodium onto a second porous refractory metal oxide material; combining the first and second impregnated porous refractory oxide materials to give a first composition; impregnating platinum onto a third porous refractory metal oxide material to give a second composition; and applying the first and second compositions onto a substrate such that the first and second compositions are present in a layered or zoned configuration.

Embodiment 32

The method of any preceding or subsequent embodiment, wherein the first, second, and third refractory metal oxide materials comprise alumina.

Embodiment 33

The method of any preceding or subsequent embodiment, wherein the impregnating palladium step comprises impregnating at least a portion of the palladium onto alumina and impregnating at least a portion of the palladium onto an oxygen storage component.

Embodiment 34

The method of any preceding or subsequent embodiment, further comprising impregnating palladium onto the third porous refractory material.

Embodiment 35

The method of any preceding or subsequent embodiment, wherein the third refractory metal oxide is substantially free of ceria.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1B:
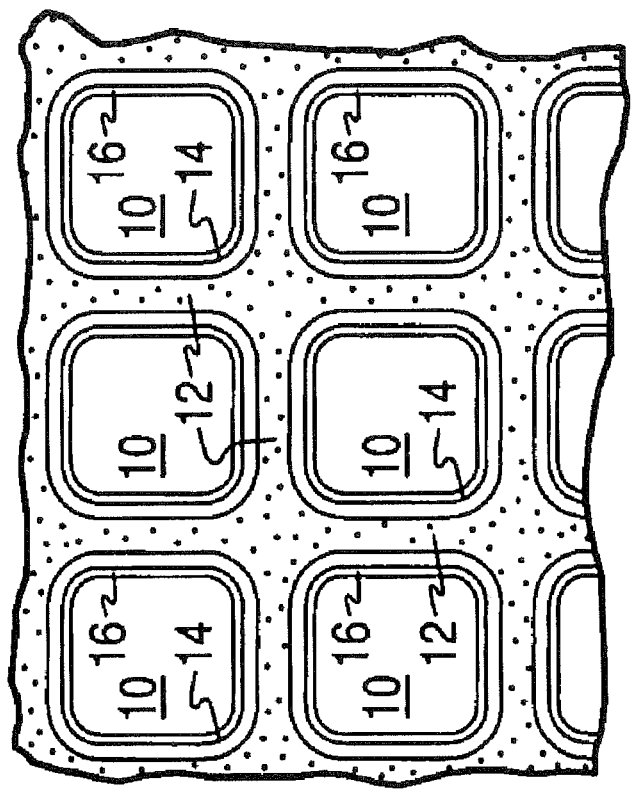
FIG. 1B is a partial cross-sectional view enlarged relative to FIG. 1 and taken along a plane parallel to the end faces of the substrate carrier of FIG. 1, which shows an enlarged view of a plurality of the gas flow passages shown in FIG. 1.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention is directed to an exhaust gas purifying catalyst and methods for its use. More particularly, the invention pertains to an exhaust gas purifying catalyst that provides a three-way conversion (TWC) function and which may specifically be used to treat exhaust gas streams, especially those emanating from lean burn gasoline engines. As such, in preferred embodiments, the catalysts disclosed herein can efficiently oxidize hydrocarbons in lean conditions and preferably at low temperatures. Such catalysts generally comprise at least three different platinum group metals (PGMs) impregnated on porous support materials. As used herein, "impregnated" or "impregnation" refers to permeation of the catalytic material into the porous structure of the support material. The TWC composition(s) can be prepared using incipient wetness impregnation techniques and coated onto a catalyst substrate using a washcoat technique as set forth more fully below.

Catalyst Composition

In preferred embodiments according to the present disclosure, at least two different catalyst compositions are provided. Typically, both compositions include at least one PGM component impregnated on a porous refractory oxide support, wherein the PGM components and porous refractory oxide supports can be the same or different in the two or more compositions. It is noted that, at various places throughout the application, these two different catalyst compositions are referred to as a "first composition" and a "second composition." However, this is not intended to be limiting and the designation of a particular composition as "first" or "second" is arbitrary and does not indicate, e.g., the positioning of one composition with respect to another composition.

As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. The concentrations of PGM component (e.g., Pt, Pd, Rh or a combination thereof) can vary, but will typically be from about 0.1 wt. % to about 10 wt. % relative to the weight of the porous refractory oxide support material (e.g., about 1 wt. % to about 6 wt. % relative to the refractory oxide support).

As used herein, "porous refractory oxide" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia-alumina, and alumina-ceria. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 m$^2$/g, often up to about 200 m$^2$/g or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of 60 to 350 m$^2$/g, and typically 90 to 250 m$^2$/g.

In some embodiments, porous refractory metal oxides include oxygen storage components (OSCs). "OSC" refers to an oxygen storage component, which is an entity that has multi-valent oxidation states and can actively react with oxidants such as oxygen (O$_2$) or nitric oxides (NO$_2$) under oxidative conditions, or reacts with reductants such as carbon monoxide (CO), hydrocarbons (HC), or hydrogen (H$_2$) under reduction conditions. Certain exemplary OSCs are rare earth metal oxides, which refers to one or more oxides of scandium, yttrium, and the lanthanum series defined in the Periodic Table of Elements. Examples of suitable oxygen storage components include ceria and praseodymia and combinations thereof. Delivery of an OSC to the washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

A first composition generally comprises palladium and rhodium, wherein both the palladium and rhodium are impregnated on porous refractory metal oxides. Although the palladium and rhodium can be impregnated on the same porous refractory metal oxide, in preferred embodiments, they are impregnated on separate porous refractory metal oxides, creating separate palladium-impregnated porous refractory metal oxide and rhodium-impregnated porous refractory metal oxide materials. The compositions of the porous refractory metal oxides on which the palladium and rhodium are impregnated can be the same or different (for example, at least a portion of both the palladium and rhodium can, in certain embodiments, be impregnated on alumina, preferably with the palladium and rhodium being impregnated on different alumina particles from one another).

For example, in some embodiments, at least a portion of the palladium is impregnated on a porous refractory metal oxide that is not considered an oxygen storage component (e.g., including but not limited to, alumina, silica, zirconia, titania, and physical mixtures or chemical combinations thereof, including atomically-doped combinations and including high surface area or activated compounds such as activated alumina). In certain specific embodiments, such porous refractory metal oxides can advantageously include alumina.

In some embodiments, at least a portion of the palladium is impregnated on a porous refractory metal oxide that is an OSC. Certain exemplary OSCs in this regard include ceria, lanthana, praseodymia, neodymia, niobia, europia, samaria, ytterbia, yttria, zirconia, and combinations and composites thereof. In particular, in some embodiments, a ceria-zirconia composite is employed, which can be, for example, ceria-zirconia, ceria-zirconia-lanthana, or a combination thereof.

Although it may be preferable to have at least a portion of the palladium in the first composition impregnated on an OSC and at least a portion of the palladium in the first composition impregnated on a non-OSC porous refractory metal oxide, it is noted that in some embodiments, substantially all the palladium in the first composition can be impregnated on an OSC or substantially all the palladium in the first composition can be impregnated on a non-OSC porous refractory metal oxide. Where at least a portion of the palladium is impregnated on an OSC and at least a portion of the palladium is impregnated on a non-OSC porous refractory material, the ratio of these two materials with respect to one another can vary widely. For example, in some embodiments, the two palladium-impregnated materials are provided in a weight ratio of about 1:50 to about 50:1 OSC-impregnated palladium to non-OSC-impregnated palladium. In some embodiments, the palladium-impregnated materials are in amounts such that about 25% to about 75% of the total weight of palladium is impregnated onto an oxygen storage component. In one particular embodiment, these materials are provided in a roughly 1:1 weight ratio.

The rhodium component in the first composition is advantageously provided in the form of rhodium impregnated on one or more non-OSC porous refractory metal oxides. For example, substantially all of the rhodium in the first composition is advantageously impregnated on a porous refractory metal oxide that is not considered an oxygen storage component (e.g., including but not limited to, alumina, silica, zirconia, titania, and physical mixtures or chemical combinations thereof, including atomically-doped combinations and including high surface area or activated compounds such as activated alumina). In certain specific embodiments, such porous refractory metal oxides can advantageously include alumina.

It is noted that, although the palladium and the rhodium in the first composition are described herein as being impregnated on separate refractory metal oxides, it is possible in certain embodiments, that some of the palladium and rhodium may be impregnated on the same refractory metal oxide. For example, in some embodiments, the slurry processing methods that will be described in further detail herein below can result in the inclusion of some rhodium on a refractory metal oxide comprising palladium. This mixed impregnation is not particularly desirable, but is a typical consequence of the processing methods employed according to the methods detailed herein. Accordingly, in various embodiments, the first composition can be described as comprising "substantially separate" palladium and rhodium-impregnated refractory metal oxides. For example, in various embodiments, less than about 40% by weight, less than about 30% by weight, less than about 20% by weight, less than about 10% by weight, or less than about 5% by weight of the total rhodium content in the first composition can be impregnated on a refractory metal oxide which further comprises impregnated palladium.

The weight ratio of the palladium-impregnated material and the rhodium-impregnated material in the first composition can vary. For example, in some embodiments, the palladium-impregnated material and the rhodium-impregnated material are present in a weight ratio of about 1:10 to about 10:1 or about 1:5 to about 5:1. In specific embodiments, a roughly 1:1 weight ratio can be employed. In certain embodiments, the disclosure further provides a two-metal catalyst composition comprising palladium-impregnated metal oxide and rhodium-impregnated metal oxide material that are intimately mixed with one another.

The second composition generally comprises platinum impregnated onto a porous refractory metal oxide material. In certain embodiments, the second composition comprises substantially no OSCs (however, the second composition is not limited thereto) and, in particularly preferred embodiments, the second composition comprises substantially no ceria. By "substantially no ceria" is meant that the second composition comprises less than about 15% by weight, less than about 10% by weight, less than about 5% by weight, less than about 2% by weight, or less than about 1% by weight ceria. As such, preferred embodiments comprise platinum impregnated on, e.g., alumina, silica, zirconia, titania, lanthana and physical mixtures or chemical combinations thereof, including atomically-doped combinations and including high surface area or activated compounds such as activated alumina (e.g., including, but not limited to, lanthana-stabilized alumina). In certain specific embodiments, such porous refractory metal oxides can advantageously include alumina.

The second composition typically comprises palladium in addition to platinum, in the form of palladium impregnated on a porous refractory metal oxide that is not considered an oxygen storage component (e.g., including but not limited to, alumina, silica, zirconia, titania, and physical mixtures or chemical combinations thereof, including atomically-doped combinations and including high surface area or activated compounds such as activated alumina). The palladium generally serves a stabilizing function in the second composition and there are no particular limitations on the platinum to palladium ratio in the second composition. In certain embodiments, however, the platinum-impregnated refractory metal oxide can be included in the second composition in an amount such that the weight ratio of platinum to palladium in the second composition is about 2:1 to about 20:1, e.g., about 8:1 to about 12:1.

Substrate

According to one or more embodiments, the substrate for the catalyst composition(s) may be constructed of any material typically used for preparing automotive catalysts and will typically comprise a metal or ceramic honeycomb structure. The substrate typically provides a plurality of wall surfaces upon which the TWC washcoat compositions disclosed herein are applied and adhered, thereby acting as a carrier for the catalyst compositions.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. In some embodiments, the substrate may be an asymmetrical cell wall flow substrate wherein the inlet cells have a different size than the outlet cells. However, it will be understood that the invention is not limited to a particular substrate type, material, or geometry. Note that where the substrate is a wall-flow substrate, the catalyst composition can permeate into the pore structure of the porous walls (i.e., partially or fully occlude the pore openings) in addition to being disposed on the surface of the walls.

Figure 1A:
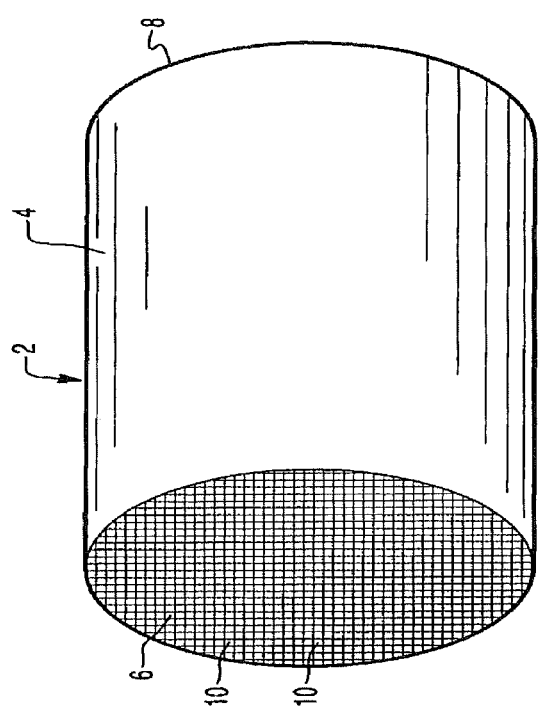
FIG. 1A is a perspective view of a honeycomb-type substrate carrier which may comprise a three-way conversion (TWC) washcoat composition in accordance with the present invention.

FIGS. 1A and 1B illustrate an exemplary substrate 2 in the form of a flow-through substrate coated with a washcoat composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

In describing the quantity of washcoat or catalytic metal component or other component of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. The total loading of the compositions (including both the first and second compositions) on the catalyst substrate, such as a monolithic flow-through substrate, is typically from about 0.5 to about 6 g/in$^3$, and more typically from about 1 to about 5 g/in$^3$. Total loading of the PGM component without support material (i.e., the Pt, Rh, Pd, or combination thereof) is typically in the range of about 30 to about 200 g/ft$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making Catalyst Compositions

Preparation of the PGM-impregnated refractory oxide materials typically comprises impregnating the refractory oxide support material in particulate form with a PGM solution, such as one or more of a platinum solution, a palladium solution, and a rhodium solution. Multiple PGM components (e.g., palladium and rhodium or platinum and palladium or a portion thereof) can be impregnated at the same time or separately, and can be impregnated on the same support particles or separate support particles using an incipient wetness technique. The support particles are typically dry enough to absorb substantially all of the solution to form a moist solid.

Aqueous solutions of water soluble compounds or complexes of the PGM component are typically utilized, such as palladium nitrate, rhodium nitrate, tetraaminepalladium nitrate, rhodium nitrate, tetraamine platinum hydroxide, or rhodium acetate. Following treatment of the support particles with the PGM solution, the particles are dried, such as by heat treating the particles at elevated temperature (e.g., 100-150° C.) for a period of time (e.g., 1-3 hours), and then calcining to convert the PGM components to a more catalytically active form. An exemplary calcination process involves heat treatment in air at a temperature of about 400-550° C. for 1-3 hours. The above process can be repeated as needed to reach the desired level of PGM impregnation. The resulting material can be stored as a dry powder or in slurry form.

Where an OSC component is employed (generally in the first composition), preparation of the PGM-impregnated refractory oxide material typically comprises impregnating the OSC refractory oxide support material in particulate form with a PGM (e.g., palladium) solution using an incipient wetness technique. Again, the support particles are usually sufficiently dry to absorb substantially all of the solution to form a moist solid. Aqueous solutions of water soluble compounds or complexes of the PGM components are again typically utilized, as outlined above. Following treatment of the OSC particles with the PGM solution, the particles are dried, such as by heat treating the particles at elevated temperature (e.g., 100-150° C.) for a period of time (e.g., 1-3 hours), and then calcining to convert the base metal components to a more catalytically active oxide form. An exemplary calcination process involves heat treatment in air at a temperature of about 400-800° C. for 1-3 hours. The above process can be repeated as needed to reach the desired level of PGM impregnation. The resulting material can be stored as a dry powder or in slurry form.

Impregnation of the PGMs on the refractory oxide particles, particularly in the context of a single composition (i.e., palladium and rhodium in the first composition and palladium and platinum in the second composition) can occur in separate steps with separate particulate carrier material as noted above, or the impregnation steps can be applied to the same refractory oxide material in sequential steps. For example, one PGM component can be impregnated onto the carrier particles, followed by drying and calcining as described above, and the same carrier particles can be subjected to PGM impregnation process to impregnate a second PGM as noted above. The order of addition of the PGM components is not critical and these components can be applied to the support material in any order.

Substrate Coating Process

The above-noted catalyst compositions, either in the form of separate compositions of PGM-impregnated carriers or in mixed form (i.e., comprising composition 1 and composition 2) is mixed with water to form a slurry for purposes of coating a catalyst substrate, such as a honeycomb-type substrate. In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants).

The slurry can be milled to enhance mixing of the particles and formation of a homogenous material and, in particular, to reduce particle size. The milling can be accomplished in a ball mill, continuous mill, or other similar equipment, and the solids content of the slurry may be, e.g., about 20 to about 60 wt. %, more particularly about 30 to about 40 wt. %. In one embodiment, the post-milling slurry is characterized by a D90 particle size of about 10 to about 20 microns. The D90 is defined as the particle size at which about 90% of the particles have a finer particle size.

The slurry is then coated on the catalyst substrate using a washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. Thereafter, the coated substrate is dried at an elevated temperature (e.g., about 100 to about 150° C.) for a period of time (e.g., 1-3 hours) and then calcined by heating, e.g., at about 400 to about 600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Figure 2:
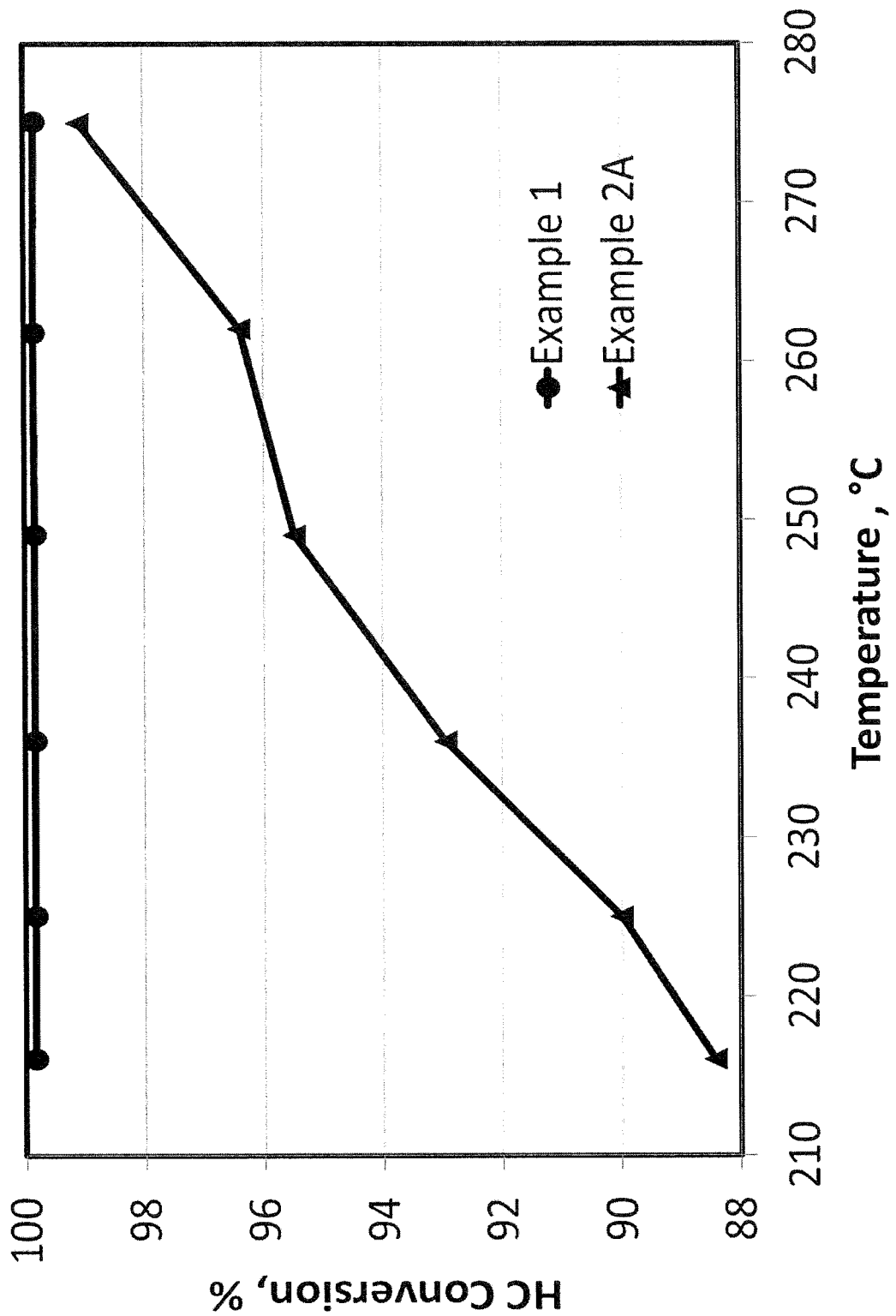
FIG. 2 is a graph of hydrocarbon (HC) conversion efficiency for an inventive and comparative catalyst composition.

The catalyst composition can be applied as a single layer or in multiple layers. In one embodiment, the catalyst composition is applied in multiple layers with each layer having a different composition (i.e., the first composition and the second composition each comprising a separate layer). Accordingly, the catalyst article can comprise one composition disposed on the substrate as a first layer and a second composition overlying at least a portion of the first composition, as a second layer. For example, the bottom layer (e.g., layer 14 of FIG. 2) can comprise the first catalyst composition of the invention including Pd- and Rh-impregnated materials (and, preferably, an OSC) and the top layer (e.g., layer 16 of FIG. 2) can comprise the second catalyst composition of the invention including Pt (and preferably Pd)-impregnated material. The relative amount of the catalyst composition in each layer can vary, with an exemplary dual layer coating comprising about 40-90% by weight of the total weight of the first catalyst composition (adjacent to the substrate surface) and about 10-60% by weight of the total weight of the second catalyst composition in the top layer.

It is noted that the catalyst article is not limited to this layered embodiment. In fact, in some embodiments, the two compositions are provided in zoned (e.g., laterally zoned) configuration with respect to one another. As used herein, the term "laterally zoned" refers to the location of the first and second compositions relative to one another, as applied on one or more substrates. Lateral means side-by-side, such that the first and second compositions are located one beside the other. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. In one or more embodiments, the catalytic article is in a laterally zoned configuration wherein the first composition is coated on a substrate upstream of the second composition. In other embodiments, the catalytic article is in a laterally zoned configuration wherein the first composition is coated on a substrate downstream of the second composition.

As noted above, a catalyst article comprising the compositions disclosed herein exhibits not only conversion of CO, NOx, and HC simultaneously in stoichiometric air-to-fuel ratio, but also can efficiently oxidize hydrocarbons in lean conditions (high air-to-fuel ratio) at low temperatures (e.g., about 200° C. to about 250° C.). Accordingly, one or more embodiments of the invention provide a catalyst article comprising the compositions of the invention characterized by an ability to convert carbon monoxide, nitrogen oxides, and hydrocarbons simultaneously and also to oxidize hydrocarbons at temperatures of about 200° C. to about 250° C.

Studies demonstrating the HC conversion efficiency in lean conditions for both an exemplary trimetal catalyst as disclosed herein and a "comparative" catalyst with a single-layer TWC composition are provided in the Examples to follow. The data shows that the inventive catalyst article exhibited significantly higher HC conversion at these conditions, even in aged form (whereas the comparative material was evaluated in fresh form). Further, studies demonstrating the CO, NOx, and HC conversion efficiency in New European Driving Cycle (NEDC) tests are provided, showing that the inventive catalyst articles exhibit similar CO, NOx, and HC conversion percentages.

Emission Treatment System

The present invention also provides an emission treatment system that incorporates the catalyst compositions described herein. A catalyst article comprising the catalyst compositions of the present invention is typically used in an integrated emissions treatment system comprising one or more additional components for the treatment of exhaust gas emissions. The relative placement of the various components of the emission treatment system can be varied. For example, the emission treatment system may further comprise a selective catalytic reduction (SCR) catalytic article. The treatment system can include further components, such as ammonia oxidation (AMOx) materials, ammonia-generating catalysts, and NOx storage and/or trapping components (LNTs). The preceding list of components is merely illustrative and should not be taken as limiting the scope of the invention.

Figure 4:
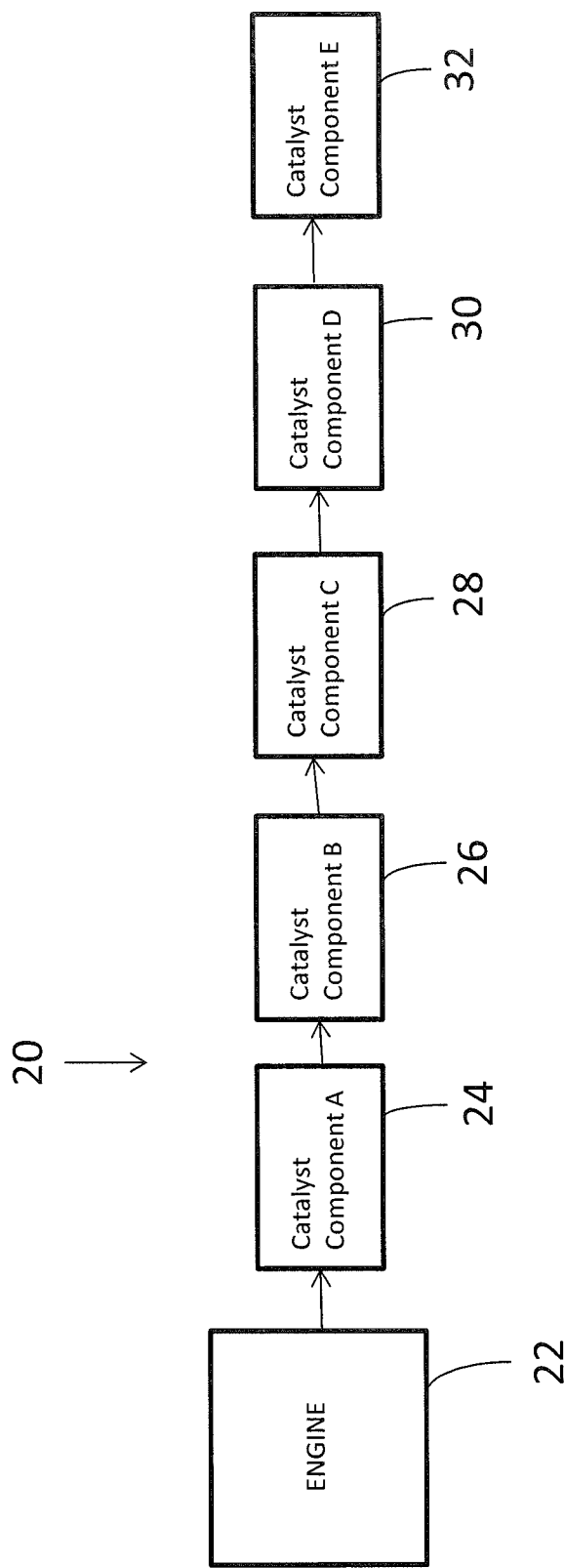
FIG. 4 shows a schematic depiction of an embodiment of an emission treatment system in which a TWC catalyst of the present invention is utilized.

One exemplary emission treatment system is illustrated in FIG. 4, which depicts a schematic representation of an emission treatment system 20. As shown, the emission treatment system can include a plurality of catalyst components in series downstream of an engine 22, such as a lean burn engine. At least one of the catalyst components will be the TWC catalyst of the invention as set forth herein. The catalyst composition of the invention could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example.

Table 1 below presents various system configurations of an emission treatment system of the invention. The reference to Components A-E in the table can be cross-referenced with the same designations in FIG. 4. It is noted that each component is connected to the next component via exhaust conduits such that the engine is upstream of component A, which is upstream of component B, which is upstream of component C, which is upstream of component D, which is upstream of component E (when present). The TWC catalyst noted in Table 1 refers to the catalyst composition of the invention. Other components are generally known (SCR=selective catalytic reduction catalyst, AMOx=ammonia oxidation catalyst, LNT=lean NOx trap, and LNT-TWC=catalyst with both TWC and LNT function (e.g., having TWC and LNT catalyst compositions in a layered format on a substrate). As recognized by one skilled in the art, in the configurations listed in Table 1, any one or more of components A, B, C, D, or E can be disposed on a particulate filter such as a wall flow filter. For example, in some embodiments, an SCR catalyst on a filter (SCRoF) can be employed, e.g., in place of the SCR components in Table 1.

TABLE 1

| Component A | Component B | Component C | Component D | Component E |
|---|---|---|---|---|
| Ammonia generating catalyst | TWC | SCR | Optional AMOx | — |
| TWC | Ammonia generating catalyst | SCR | Optional AMOx | — |
| TWC | LNT-TWC | LNT | SCR | LNT |
| LNT-TWC | TWC | LNT | SCR | LNT |
| TWC | LNT-TWC | SCR | Optional AMOx | — |
| LNT-TWC | TWC | SCR | Optional AMOx | — |
| TWC | LNT-TWC | LNT | SCR | Optional AMOx |
| LNT-TWC | TWC | LNT | SCR | Optional AMOx |
| TWC | LNT | Optional AMOx | — | — |
| TWC | SCR | Optional AMOx | — | — |
| TWC | LNT-TWC | SCR | LNT | — |
| LNT-TWC | TWC | SCR | LNT | — |

EXPERIMENTAL

Aspects of the present invention are more fully illustrated by the following examples, which are set forth to illustrate certain aspects of the present invention and are not to be construed as limiting thereof.

Example 1—Preparation of TWC Catalyst

A two layer formulation, which comprises an undercoat washcoat layer and a top washcoat layer (prepared as outlined below), was coated onto a flow-through ceramic monolith substrate carrier having a cell density of 600 cells per square inch (cpsi) and a 4 mil wall thickness, the top washcoat layer being coated over and covering the undercoat washcoat layer. The catalyst has a total 130 g/ft³ PGM nominal loading with a Pt/Pd/Rh ratio of 70/55/5.

Undercoat Washcoat Layer

50% of the total Pd in the form of palladium nitrate was introduced onto an OSC material, and the other 50% of the total Pd in the form of palladium nitrate and Rh in the form of rhodium nitrate were introduced onto activated γ-alumina. A slurry mixture containing about 46.5 wt. % of activated γ-alumina, 38.7 wt. % of OSC material ($CeO_2/ZrO_2$) with promoters, 1.1 wt. % of Pd, 0.1 wt. % of Rh, barium acetate to yield 11.6 wt. % of BaO, zirconium acetate to yield 1.9 wt. % of $ZrO_2$, was coated onto the ceramic honeycomb substrate. The total washcoat of the undercoat layer after 550° C. calcination was about 2.6 g/in³.

Topcoat Layer

The top layer was disposed on the undercoat layer. The top layer contained an activated γ-alumina, platinum, and palladium. Pd in the form of palladium nitrate and Pt in the form of platinum amine solution were introduced onto the γ-$Al_2O_3$ by conventional incipient wetness techniques. A slurry mixture containing about 94.8 wt. % of activated γ-alumina, 3.8 wt. % of Pt, 0.4 wt. % of Pd, and 0.9 wt. % of alumina-based binder, was coated over the entire undercoat layer. The total washcoat loading after 550° C. calcination for one hour in air was about 1.1 g/in³.

Comparative Example 2A—Preparation of TWC Catalyst

A single layer formulation (prepared as outlined below) was coated onto a flow-through ceramic monolith substrate carrier having a cell density of 600 cells per square inch (cpsi) and a 4 mil wall thickness. The catalyst has a total 300 g/ft³ PGM nominal loading with a Pd/Rh ratio of 294/6.

Pd in the form of palladium nitrate was introduced onto an OSC material, and Rh in the form of rhodium nitrate were introduced onto activated γ-alumina. A slurry mixture containing about 46.6 wt. % of activated γ-alumina, 46.6 wt. % of OSC material ($CeO_2/ZrO_2$) with promoters, 0.9 wt. % of Pd, 0.1 wt. % of Rh, barium acetate to yield 4.4 wt. % of BaO, zirconium acetate to yield 1.4 wt. % of $ZrO_2$, was coated onto ceramic honeycomb substrate. The total washcoat of the undercoat layer after 550° C. calcination was about 3.6 g/in³.

Comparative Example 2B—Preparation of TWC Catalyst

Example 2B has the same formulation as Example 2A, except that Example 2B has a total 215 g/ft³ PGM nominal loading with a Pd/Rh ratio of 210/5.

Example 3—HC Conversion Efficiency in Lean Condition

HC conversion efficiency for the TWC catalyst of Example 1 was tested after aging at 950° C. for 40 hours under conditions simulating engine aging. HC conversion efficiency for the TWC catalyst of Example 2A was tested in fresh (i.e., "unaged") form. HC conversion efficiency in lean conditions for both catalysts at temperatures from 215 to 275° C. was measured, and the results are presented in FIG. 3. As shown, the TWC catalyst of Example 1 exhibited tremendously higher HC conversion than the catalyst of Comparative Example 2A, although the catalyst of Example 1 was aged and the catalyst of Example 2A was in fresh form.

Example 4—CO, NOX and HC Conversion Efficiency in NEDC Condition

Figure 3:
FIG. 3 is a bar graph of carbon monoxide (CO), NOx, and HC conversion efficiency in a New European Driving Cycle (NEDC) test for an inventive and comparative catalyst composition.

The catalysts of Example 1 and Comparative Example 2B were tested for CO, NOx and HC Conversion Efficiency in the New European Driving Cycle (NEDC) test after aging at 950° C. for 100 hours, and the results are presented in FIG. 3. The catalyst of Example 1 exhibited similar CO, NOx and HC conversion percentages to the catalyst of Comparative Example 2B.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A catalyst article for treating an exhaust stream of an internal combustion engine, the article comprising a catalytic material applied on a substrate, wherein the catalytic material comprises a first composition and a second composition, wherein the first and second compositions are present in a layered configuration,
    the first composition comprising palladium impregnated onto oxygen storage component and alumina, and rhodium impregnated onto alumina; and
    the second composition comprising platinum and palladium impregnated onto alumina,
    wherein the weight ratio of platinum to palladium in the second composition is 8:1 to 12:1,
    wherein 25% to 75% of the total weight of palladium in the first composition is impregnated onto an oxygen storage component.

2. The catalyst article of claim 1, wherein the catalytic material is in layered form, such that the first composition is disposed on the substrate as a first layer and the second composition is overlying at least a portion of the first composition as a second layer.

3. The catalyst article of claim 1, wherein the catalytic material is in layered form, such that the second composition is disposed on the substrate as a first layer and the first composition is overlying at least a portion of the second composition as a second layer.

4. The catalyst article of claim 1, wherein the palladium-impregnated onto oxygen storage component and alumina and the rhodium-impregnated onto alumina in the first composition are intimately mixed.

5. The catalyst article of claim 1, wherein the palladium-impregnated onto oxygen storage component and alumina and the rhodium-impregnated onto alumina in the first composition are present in a weight ratio of 1:5 to 5:1.

6. The catalyst article of claim 1, wherein the oxygen storage component is selected from the group consisting of ceria, lanthana, praseodymia, neodymia, niobia, europia, samaria, ytterbia, yttria, zirconia, and combinations and composites thereof.

7. The catalyst article of claim 1, wherein the oxygen storage component is a ceria-zirconia composite.

8. The catalyst article of claim 7, wherein the ceria-zirconia composite is selected from the group consisting of ceria-zirconia, ceria-zirconia-lanthana, and combinations thereof.

9. The catalyst article of claim 1, wherein the second composition comprises less than 1% by weight ceria.

10. The catalyst article of claim 1, wherein the substrate is a monolithic substrate.

11. The catalyst article of claim 1, wherein, under stoichiometric engine conditions, the catalytic material is effective to convert carbon monoxide, nitrogen oxides, and hydrocarbons simultaneously.

12. The catalyst article of claim 1, wherein, under lean engine conditions, the catalytic material is effective to oxidize hydrocarbons at temperatures of 200° C. to 250° C.

13. A method for treating an exhaust gas stream comprising hydrocarbons, carbon monoxide, and nitrogen oxides, comprising: contacting the exhaust gas stream with a catalyst article according to claim 1.

14. A method for making a catalyst article according to claim 1, comprising:
impregnating palladium onto a first porous refractory metal oxide material; impregnating rhodium onto a second porous refractory metal oxide material;
combining the first and second impregnated porous refractory oxide materials to produce a first composition;
impregnating platinum onto a third porous refractory metal oxide material to produce a second composition;
applying the first and second compositions onto a substrate such that the first and second compositions are present in a layered or zoned configuration.

15. The method of claim 14, wherein the first, second, and third refractory metal oxide materials comprise alumina.

16. The method of claim 14, wherein the impregnating palladium step comprises impregnating at least a portion of the palladium onto alumina and impregnating at least a portion of the palladium onto an oxygen storage component.

17. The method of claim 14, further comprising impregnating palladium onto the third porous refractory material.

18. The method of claim 14, wherein the third refractory metal oxide comprises less than 1% by weight of ceria.

19. An exhaust gas treatment system comprising a catalyst article according to claim 1, located downstream of an internal combustion engine producing an exhaust stream.

20. The exhaust gas treatment system of claim 19, wherein the engine comprises a lean burn engine.

21. The exhaust gas treatment system of claim 19, further comprising one or more components selected from the group consisting of an integrated lean NOx trap-three way conversion catalyst (LNT-TWC), a selective catalytic reduction (SCR) catalyst, a lean NOx trap (LNT), an ammonium oxidation (AMOx) catalyst, an ammonia-generating catalyst, and a selective catalytic reduction catalyst on a filter (SCRoF).

22. The exhaust gas treatment system of claim 19, further comprising a SCR catalyst downstream of the catalyst article.

23. The exhaust gas treatment system of claim 19, further comprising a LNT downstream of the catalyst article.

24. The exhaust gas treatment system of claim 19, further comprising an AMOx downstream of the catalyst article.

* * * * *